United States Patent
Zinbo

(10) Patent No.: US 7,186,472 B2
(45) Date of Patent: Mar. 6, 2007

(54) MAGNETIC RECORDING MEDIUM

(75) Inventor: Noboru Zinbo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 33 days.

(21) Appl. No.: 10/852,129

(22) Filed: May 25, 2004

(65) Prior Publication Data

US 2004/0241498 A1    Dec. 2, 2004

(30) Foreign Application Priority Data

May 26, 2003    (JP)    ............ P.2003-147717

(51) Int. Cl.
*G11B 5/708* (2006.01)

(52) U.S. Cl. ............ 428/844.3; 428/844; 428/845.3

(58) Field of Classification Search ............ 428/328, 428/329, 336, 694 BN, 694 BB, 844.3, 845.1, 428/845.3
See application file for complete search history.

(56) References Cited

U.S. PATENT DOCUMENTS 5,792,548 A * 8/1998 Kuwajima et al. .......... 428/215
5,958,565 A * 9/1999 Hattori et al. ............ 428/845.1
6,312,796 B1 * 11/2001 Zinbo ........................ 428/323

FOREIGN PATENT DOCUMENTS

JP    2001-101647 A    4/2001

OTHER PUBLICATIONS

Machine Translation of JP 2001-101647 A.*

* cited by examiner

*Primary Examiner*—Kevin M. Bernatz
(74) *Attorney, Agent, or Firm*—Sughrue Mion, PLLC

(57) ABSTRACT

A magnetic recording medium comprising a support and a magnetic layer containing an abrasive, a binder and ferromagnetic powder dispersed in the binder, wherein the magnetic layer has a thickness of from 20 to 500 nm, the abrasive has a Mohs' hardness of 5 or more and a relative abrasive velocity of less than 200, and value A of a relational expression A=K/Z of an average particle size K of the abrasive and the thickness Z of the magnetic layer is from 0.1 to 3.0.

14 Claims, No Drawings

MAGNETIC RECORDING MEDIUM

FIELD OF THE INVENTION

The present invention relates to a coating type magnetic recording medium having high recording density. In particular, the present invention relates to a magnetic recording medium for high density recording containing ferromagnetic metal fine powder or hexagonal ferrite fine powder in an uppermost layer. The present invention relates to a magnetic recording medium stable in running property when used in various environments.

BACKGROUND OF THE INVENTION

A coating type magnetic recording medium consists of a nonmagnetic support such as polyethylene terephthalate, and a magnetic layer formed by coating a magnetic coating solution comprising ferromagnetic powder-homogeneously dispersed in a binder solution of a resin. As the ferromagnetic powder, acicular ferromagnetic alloy powders, e.g., $\gamma\text{-Fe}_2\text{O}_3$ and Fe—Co have been conventionally used, but for the improvement of recording density, ferromagnetic powders using superfine particle magnetic powders of hexagonal ferrite are developed and partially put to practical use in recent years.

In the field of the magnetic disc, along with the increase in the amount of data to be dealt with, and the increase of the capacity of floppy discs has been demanded.

In the field of the magnetic tape also, with the prevalence of office computers, such as minicomputers, personal computers and work station, magnetic tapes for recording computer data as external storage media (so-called backup tapes) have been vigorously studied. For putting magnetic tapes for such uses to practical use, the improvement of recording capacity has been strongly demanded conjointly with the miniaturization of a computer and the increase of information processing performance for achieving high capacity recording and miniaturization.

Magnetic heads working with electromagnetic induction as the principle of operation (an induction type magnetic head) are conventionally used and spread. However, the magnetic heads of this type are approaching their limit for use in the field of higher density recording and reproduction. That is, it is necessary to increase the number of winding of the coil of a reproduction had to obtain larger reproduction output, but when the winding number is increased, the inductance increases and the resistance at high frequency heightens, as a result, the reproduction output lowers. In recent years, reproduction heads that work with MR (magneto-resistance) as the principle of operation are proposed and get to be used in hard discs. As compared with the induction type magnetic disc, several times of reproduction output can be obtained by using MR head. Further, since an induction coil is not used in MR head, noises generated from instruments, e.g., impedance noises, are largely reduced, therefore, it becomes possible to obtain a great S/N ratio by lowering the noise coming from magnetic recording media. In other words, good recording and reproduction can be done and high density recording characteristics can be drastically improved by lessening the noise of magnetic recording media hiding behind the instruments.

Abrasives are generally added to a magnetic layer for ensuring running durability conjointly with the improvement of electromagnetic characteristics. For instance, it is well known to use abrasives having high Mohs' hardness, typically $\alpha$-alumina, in a magnetic layer.

For example, JP-A-2001-101647 (The term "JP-A" as used herein refers to an "unexamined published Japanese patent application".) proposes a magnetic recording medium comprising a nonmagnetic support having a nonmagnetic layer containing a binder, and a magnetic layer having a thickness of 0.5 µm or less provided on the nonmagnetic layer after being coated and dried, wherein the abrasive contained in the magnetic layer has a Mohs' hardness of 5 or more, and a relative abrasive velocity of 200 or more, and value (A) of the relational expression (A)=(D)/(T) of the average particle size (D) of the abrasive and the magnetic layer thickness (T) is from 0.55 to 1.20.

In a coating type magnetic recording medium, it is thought that when magnetic powder is made finer and magnetic layer is made thinner with the trend of higher density, it is desired to make abrasive finer to ensure smoothing of a magnetic layer, but as a matter of fact when abrasive is made finer, the relative abrasive velocity lowers and the compatibility with running durability is difficult.

In particular, when an MR head is used in the reproduction of a magnetic recording medium, the influence of abrasive becomes great and when abrasive force is increased to maintain running durability, it is accompanied by reduction of S/N ratio and abrasion of a head.

SUMMARY OF THE INVENTION

An object of the invention is to provide a coating type magnetic recording medium having good running durability and electromagnetic characteristics, and low in head abrasion.

The above object of the present invention can be achieved by the following means.

(1) A magnetic recording medium comprising a support having provided thereon a magnetic layer containing ferromagnetic powder dispersed in a binder, wherein the thickness of the magnetic layer is from 20 to 500 nm, the Mohs' hardness of an abrasive contained in the magnetic layer is 5 or more and the relative abrasive velocity is less than 200, and value A in the relational expression A=K/Z of the average particle size K of the abrasive and the magnetic layer thickness Z is from 0.1 to 3.0.

(2) The magnetic recording medium as described in the above item (1), wherein a substantially nonmagnetic lower layer is provided between the support and the magnetic layer.

(3) The magnetic recording medium as described in the above item (1) or (2), wherein the abrasive is alumina having an average particle size of from 10 to 160 nm.

DETAILED DESCRIPTION OF THE INVENTION

In a magnetic recording medium according to the invention, a magnetic layer has a thickness of from 20 to 500 nm, an abrasive contained in the magnetic layer has a Mohs' hardness of 5 or more and a relative abrasive velocity of less than 200, and value A in the relational expression A=K/Z of the average particle size K of the abrasive and the magnetic layer thickness Z is from 0.1 to 3.0.

The invention can provide a magnetic recording medium excellent in running durability, such as still durability, good in S/N ratio and less in head abrasion by selecting an abrasive having specific average particle size to the thickness of a magnetic layer and yet having appropriate abrasive force even when the thickness of the magnetic layer is lessened.

In the present invention, relative abrasive velocity is a value obtained by, while supplying a certain amount of abrasive slurry, abrading Mn—Zn ferrite single crystal (111) face on a buff, and comparing the abraded amount (length) per unit time with the abraded amount of a standard sample. The composition of the abrasive slurry comprised 2 mass (weight) parts of the sample and 98 mass parts of water. The standard sample comprised 2 mass parts of AKP20 (manufactured by Sumitomo Chemical Co., Ltd.) and 98 mass parts of water, and the value was a relative value with the abrasive velocity of the standard sample as 100.

The relative abrasive velocity in the invention is less than 200, preferably from 60 to less than 200, and more preferably from 70 to 190. When a relative abrasive velocity is 200 or more, S/N ratio deteriorates and head abrasion increases.

Value A of the relational expression A=K/Z of the average particle size K of an abrasive and a magnetic layer thickness Z is from 0.1 to 3.0, preferably from 0.5 to 2.5. When value A is smaller than 0.1, abrasive force is small and the friction coefficient becomes high, and/or the soil around a guide roll is liable to increase, while when it is greater than 3.0, S/N ratio lowers and the abrasion of heads tends to increase.

Average particle sizes are obtained from the following particle sizes.

In the specification of the invention, the sizes of various fine particles (hereinafter referred to as "particle size") such as abrasives, ferromagnetic powders and carbon blacks are obtained by a high resolution transmission electron microphotograph and an image analyzer. A particle size can be obtained by tracing the outline of a high resolution transmission electron microphotograph (magnification of from 20,000 to 100,000) with an image analyzer. That is, particle sizes are indicated as follows: (1) in the case where the shapes of particles are acicular, spindle-like or columnar (provided that the height is larger than the longest diameter of the base), a particle size is indicated by the length of a long axis constituting the particle, i.e., a long axis length, (2) in the case where the shapes of particles are tabular or columnar (provided that the thickness or height is smaller than the longest diameter of the tabular plane or the base), indicated by the longest diameter of the tabular plane or the base, i.e., a tabular diameter, and (3) in the case where the shapes of particles are spherical, polyhedral or amorphous and it is impossible to specify the length of long axis constituting the particle from the shape, indicated by an equivalent-circle diameter. An equivalent-circle diameter is a diameter of a circle obtained by a projecting method.

The average particle sizes of these powders are the arithmetic mean of these particle sizes, and obtained by measuring 500 primary particles as above. Primary particles are independent particles not agglomerated.

When the shapes of particles are specific, e.g., the case (1) in the above definition of particle sizes, an average particle size is called an average long axis length, and the arithmetic mean of the value of (long axis length/short axis length) is called an average acicular ratio. Further, a short axis length is the maximum of the axes orthogonal to long axes. In the case (2) of the above definition, an average particle size is called an average tabular size, and the arithmetic mean of the value of (tabular size/tabular thickness) is called an average tabular ratio. Here, a tabular thickness is a thickness or a height. In the case of (3) in the definition, an average particle size is called an average particle size.

In the measurement of a particle size, standard deviation/average value indicated by percentage is defined as a variation coefficient.

It is preferred to indicate K as an average particle size in the above definition of average particle sizes.

Z is obtained as follows.

A piece of a sample is cut out of a magnetic recording medium in the machine direction in a thickness of about 0.1 μm with a diamond cutter, observed with a transmission electron microscope of 30,000 magnifications, and photographed. The print size of the photograph is an A4 size (297×210 mm). Then, the interfaces and the surface of the magnetic layer are rimmed black by visual judgment paying attentions to the difference of the shapes of the ferromagnetic powder and nonmagnetic powder in the magnetic layer and the nonmagnetic layer. Then, the distance of the rimmed lines is measured with image analyzer KS400 (manufactured by Carl Zeiss Corp.). Measurement is performed at 500 measuring points over the length of the photograph of 21 cm. The value obtained by dividing the simple addition mean of the measuring values at that time by the magnification is taken as the thickness of the magnetic layer.

Z is a dry thickness, and is from 20 to 500 nm, preferably from 30 to 200 nm. When a thickness is thinner than 20 nm, the quality of the product and the productivity are not ensured, while when it is greater than 500 nm, electromagnetic characteristics cannot be improved. When a magnetic layer comprises two or more layers, Z means the total thickness.

Abrasives are not particularly restricted so long as they satisfy the above condition, but alumina having an average particle size of from 10 to 160 nm is preferred, and more preferably an average particle size is from 30 to 150 nm.

The variation coefficient of the particle size of abrasives is preferably from 0 to 50%, more preferably from 0 to 30%.

A magnetic recording medium according to the invention is described below with every constituent element.

Magnetic Layer:

A magnetic recording medium in the invention may be provided with a magnetic layer containing ferromagnetic powder on one side of a support or on both sides.

A magnetic layer provided on one side of a support may be a monolayer or may be multilayers each having different composition. A substantially nonmagnetic lower layer (hereinafter sometimes merely referred to as "a lower layer") may be provided between a support and a magnetic layer. It is preferred to provide a magnetic layer on a lower layer in the invention. A magnetic layer in such a case is referred to as an upper layer or an upper magnetic layer.

An upper layer can be formed by wet-on-wet coating (W/W) after simultaneous or successive coating of a lower layer while the lower layer is still wet or can be formed by wet-on-dry coating (W/D) after the lower layer coated is dried. W/W coating is preferred in view of the productivity. Since an upper layer and a lower layer can be formed simultaneously by W/W coating, a surface treating step, e.g., a calendering step, can be utilized effectively and the surface roughness of the upper magnetic layer can be improved even when the layer is a thin layer.

As ferromagnetic powders, ferromagnetic iron oxide, ferromagnetic cobalt-modified iron oxide, $CrO_2$ powder, hexagonal ferrite powder and various ferromagnetic metal powders can be used in the invention, but ferromagnetic metal powder and hexagonal ferrite powder are preferably used. Ferromagnetic metal powder and hexagonal ferrite powder are described in detail below.

Ferromagnetic Metal Powder:

Ferromagnetic metal powders for use in the invention are preferably ferromagnetic metal powders mainly comprising α-Fe as a main component. Ferromagnetic metal powders may contain, in addition to the prescribed atoms, the following atoms, e.g., Al, Si, Ca, Mg, Ti, Cr, Cu, Y, Sn, Sb, Ba, W, La, Ce, Pr, Nd, P, Co, Mn, Zn, Ni, Sr and B. It is particularly preferred to contain at least one of Al, Ca, Mg, Y, Ba, La, Nd, Sm, Co and Ni, in addition to α-Fe. The alloy of Co with Fe is particularly preferred to increase saturation magnetization and improve demagnetization. The content of Co is preferably from 1 to 40 atomic %, more preferably from 15 to 35 atomic %, and still more preferably from 20 to 35 atomic %, the content of rare earth elements such as Y is preferably from 1.5 to 15 atomic %, more preferably from 3 to 12 atomic %, and still more preferably from 4 to 10 atomic %, and the content of Al is preferably from 1.5 to 12 atomic %, more preferably from 3 to 10 atomic %, and still more preferably from 4 to 9 atomic %, each based on Fe. Rare earth including Y and Al function as a sintering preventing agent, and a higher sintering preventing effect can be obtained when they are used in combination. These ferromagnetic powders may be treated with the later-described dispersants, lubricants, surfactants and antistatic agents in advance before dispersion. The specific examples of ferromagnetic metal powders are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005 and 3,389,014.

A small amount of hydroxide or oxide may be contained in ferromagnetic metal powders. Ferromagnetic metal powders manufactured by well-known methods can be used, e.g., the following methods are exemplified, e.g., a method of reducing a hydrous iron oxide or an iron oxide having been subjected to sintering inhibiting treatment with reducing gas, e.g., hydrogen, to thereby obtain Fe or Fe—Co particles; a method of performing reduction with a composite organic acid salt (mainly oxalate) and reducing gas, e.g., hydrogen; a method of heat-decomposing a metal carbonyl compound; a method of adding a reducing agent, e.g., sodium boron hydride, hypophosphite or hydrazine to an aqueous solution of ferromagnetic metal, to thereby effect reduction; and a method of evaporating a metal in low pressure inert gas to obtain powder. The thus-obtained ferromagnetic metal powders are subjected to well-known gradual oxidation treatment. A method of forming oxide films on the surfaces of ferromagnetic metal powders by reducing a hydrous iron oxide or an iron oxide with reducing gas, e.g., hydrogen, and regulating partial pressure of oxygen-containing gas and inert gas, and the temperature and time is less in demagnetization and preferably used in the invention.

Ferromagnetic metal powders for use in a magnetic layer in the invention have a specific surface area ($S_{BET}$) measured by a BET method of from 40 to 130 $m^2/g$, preferably from 45 to 120 $m^2/g$. When $S_{BET}$ is 40 $m^2/g$ or less, noise increases, and when it is 130 $m^2/g$ or more, a smooth surface is difficult to obtain and not preferred. Ferromagnetic metal powders for use in a magnetic layer in the invention have a crystallite size of from 50 to 180 Å, preferably from 60 to 170 Å, and more preferably from 80 to 165 Å. Ferromagnetic metal powders have an average particle size, i.e., an average long axis length or an average tabular diameter, of preferably from 30 to 80 nm, and more preferably from 35 to 75 nm, an average acicular ratio or an average tabular ratio of preferably from 3 to 15, and more preferably from 3 to 10, a saturation magnetization as of generally from 80 to 170 $A·m^2/kg$, preferably from 90 to 160 $A·m^2/kg$, and more preferably from 95 to 150 $A·m^2/kg$, and a coercive force of preferably from 135 to 279 kA/m, and more preferably from 143 to 239 kA/m.

Ferromagnetic metal powders preferably have a moisture content of from 0.1 to 2 mass %. It is preferred to optimize the moisture content of ferromagnetic metal powders by selecting the kinds of binders. The pH of ferromagnetic metal powders is preferably optimized by the combination with the binder to be used. The pH range is from 6 to 12, preferably from 7 to 11. The SA (stearic acid) adsorption amount of ferromagnetic metal powders (the standard of the basic point of the surface) is from 1 to 15 $\mu mol/m^2$, preferably from 2 to 10 $\mu mol/m^2$, and more preferably from 3 to 8 $\mu mol/m^2$. When ferromagnetic metal powders high in a stearic acid adsorption amount are used, it is preferred to manufacture a magnetic recording medium by modifying the surfaces of ferromagnetic metal powders with organic substances which are strongly adsorbed onto the surfaces of the of ferromagnetic metal powders. Ferromagnetic metal powders sometimes contain soluble inorganic ions (e.g., Na, Ca, Fe, Ni, Sr, $NH_4$, $SO_4$, Cl, $NO_2$ and $NO_3$). These inorganic ions are preferably substantially not contained, but the properties of ferromagnetic metal powders are not particularly affected if the total content of each ion is about 300 ppm or less. Ferromagnetic metal powders for use in the invention preferably have less voids and the value of the voids is preferably 20% by volume or less, and more preferably 5% by volume or less. The configuration of ferromagnetic metal powders is not especially restricted, and any configuration such as an acicular, ellipsoidal or spindle configuration may be used so long as the above-described particle sizes and magnetic characteristics are satisfied. SFD (switching field distribution) of ferromagnetic metal powders themselves is preferably small. It is necessary to make Hc distribution of ferromagnetic metal powders narrow. When SFD of a tape is small, magnetic flux revolution becomes sharp and peak shift becomes small, which is suitable for high density digital magnetic recording. For achieving small Hc distribution, making particle size distribution of goethite in ferromagnetic metal powders good, using monodispersed α-$Fe_2O_3$, and preventing sintering among particles are effective methods.

Hexagonal Ferrite Magnetic Powder:

Hexagonal ferrite magnetic powders are not especially restricted, but the examples of hexagonal ferrite magnetic powders preferably used in the present invention include magnetoplumbite hexagonal ferrites having crystal structure represented by $BaFe_{12}O_{19}$ in which the average valence of iron or the metals substituted with iron is trivalent, or having an M type fundamental composition; magnetoplumbite hexagonal ferrites having crystal structure represented by $BaM_2Fe_{16}O_{27}$ in which divalent metals (herein after referred to as M) are present, or having a W type fundamental composition; magnetoplumbite hexagonal ferrites having crystal structure represented by $BaMFe_6O_{11}$, or having a Y type fundamental composition; magnetoplumbite hexagonal ferrites having crystal structure represented by $Ba_3M_2Fe_{24}O_{41}$, or having a Z type fundamental composition; and complex type hexagonal ferrites epitaxially complexed with spinel ferrite on the surfaces of these hexagonal ferrites.

As M in the compositions of hexagonal ferrite magnetic powders and divalent metals constituting spinel ferrites, Co, Fe, Ni, Mn, Mg, Cu and Zn are exemplified.

In particular in W type and complex type hexagonal ferrites, since alkaline metals are scarce and transition metals and oxygen predominate in bulk composition and powder surface composition, surface chemical interaction of powder surface and binder by acids and bases is deficient, and both hexagonal ferrites are great in the amount of magnetization and rich in magnetic cohesive force. These hexagonal ferrite magnetic powders are also effectively used in the present invention.

Hexagonal ferrite magnetic powders can be manufactured by any of a glass crystallization method, a hydrothermal synthesizing method, a coprecipitation method and a flux method. For achieving high density recording as the magnetic powder for a magnetic recording medium, it is important in any method to find conditions to make configuration distribution and particle size distribution sharp.

The average tabular diameter of hexagonal ferrite powders for use in the invention differs dependent upon recording density but is preferably from 10 to 35 nm, more preferably from 15 to 32 nm. When the average tabular diameter of hexagonal ferrite powders is less than 10 nm, lowering of magnetization is conspicuous and not preferred as a recording medium, and when it exceeds 35 nm, noise factors increase and not preferred for high density recording. The tabular diameter used here means the longest hexagonal diameter of the base of a hexagonal pole of hexagonal ferrite magnetic powder, and the average tabular diameter is the arithmetic mean of it.

On the other hand, an average tabular ratio which is the arithmetic mean of tabular ratio represented by the ratio of the tabular diameter to the thickness of hexagonal ferrite powder is generally from 2 to 10, preferably from 2 to 7, and more preferably from 2 to 5. When an average tabular ratio is less than 2, magnetic powder is difficult to manufacture, and when it is higher than 10, magnetic cohesive force predominates over dispersing force, thus dispersion becomes difficult.

The variation coefficient of a tabular diameter can be obtained by 100×σ/average tabular diameter. The variation coefficient of a tabular diameter is preferably 35% or less. The variation coefficient of a tabular ratio is preferably 30% or less. The variation coefficient of a tabular ratio can be obtained from 100×σ/average tabular ratio. σ means the standard deviation of a tabular diameter or a tabular ratio.

Hexagonal ferrite powders have saturation magnetization ρs of from 40 to 80 A·m²/kg, a coercive force Hc of from 135 to 440 kA/m, a specific surface area $S_{BET}$ by a BET method of from 40 to 80 m²/g, and pH of from 4 to 12, preferably from 5.5 to 10, although it is preferred to optimize pH of magnetic powder by the combination with the binder to be used.

Lower Layer:

A lower layer is described in detail below. A lower layer preferably comprises nonmagnetic inorganic powder and a binder as main components. Nonmagnetic inorganic powder for use in a lower layer is selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., α-alumina having an a conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesiumoxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred for the reason that they have small particle size distribution and various means for imparting functions, and titanium dioxide and α-iron oxide are more preferred. These nonmagnetic inorganic powders preferably have an average particle size of from 0.005 to 2 μm. If necessary, a plurality of nonmagnetic inorganic powders each having a different particle size may be combined, or a single nonmagnetic inorganic powder may have broad particle size distribution so as to attain the same effect as such a combination. Nonmagnetic inorganic powders particularly preferably have an average particle size of from 0.01 to 0.2 μm. In particular, when nonmagnetic inorganic powder is a granular metallic oxide, the average particle size of the powder is preferably 0.08 μm or less, and when the nonmagnetic inorganic powder is an acicular metallic oxide, the average long axis length of the powder is preferably 0.3 μm or less, more preferably 0.2 μm or less. Nonmagnetic inorganic powders for use in the invention have a tap density of generally from 0.05 to 2 g/ml, preferably from 0.2 to 1.5 g/ml; a moisture content of generally from 0.1 to 5 mass %, preferably from 0.2 to 3 mass %, and more preferably from 0.3 to 1.5 mass %; a pH value of generally from 2 to 11, and particularly preferably between 5.5 and 10; a specific surface area $S_{BET}$ of generally from 1 to 100 m²/g, preferably from 5 to 80 m²/g, and more preferably from 10 to 70 m²/g; a crystallite size of preferably from 0.004 to 1 μm, and more preferably from 0.04 to 0.1 μm; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6. The configuration of nonmagnetic inorganic powders may be any of an acicular, spherical, polyhedral and tabular configurations. Nonmagnetic inorganic powders preferably have a Mohs' hardness of from 4 to 10. The SA (stearic acid) adsorption amount of nonmagnetic inorganic powders is from 1 to 20 μmol/m², preferably from 2 to 15 μmol/m², and more preferably from 3 to 8 μmol/m². The pH of nonmagnetic inorganic powders is preferably 3 and 6. The surfaces of nonmagnetic inorganic powders are preferably covered with $Al_2O_3$, $SiO_2$, $TiO_2$, $ZrO_2$, $SnO_2$, $Sb_2O_3$, $ZnO$ or $Y_2O_3$, $Al_2O_3$, $SiO_2$, $TiO_2$ and $ZrO_2$ are particularly preferred in dispersibility, and $Al_2O_3$, $SiO_2$ and $ZrO_2$ are still more preferred. They can be used in combination or can be used alone. According to purposes, a layer subjected to surface treatment by coprecipitation may be used. Alternatively, surfaces of particles may be covered with alumina previously, and then the alumina-covered surface may be covered with silica, or vice versa, according to purposes. A surface-covered layer maybe a porous layer, if necessary, but a homogeneous and dense surface is generally preferred.

The specific examples of nonmagnetic inorganic powders for use in a lower layer in the invention and the producing methods of them are disclosed in WO 98/35345.

A desired micro Vickers hardness can be obtained by adding carbon blacks to a lower layer, surface electrical resistance (Rs) and light transmittance can be reduced as well, which are well-known effects. It is also possible to bring about the effect of stocking a lubricant by adding carbon blacks to a lower layer. Furnace blacks for rubbers, thermal blacks for rubbers, carbon blacks for coloring and acetylene blacks can be used as carbon blacks. Carbon blacks for use in a lower layer should optimize the following characteristics by the desired effects and further effects can be obtained by the combined use in some cases.

Carbon blacks for use in a lower layer according to the invention have an $S_{BET}$ of generally from 100 to 500 m$^2$/g, preferably from 150 to 400 m$^2$/g, a DBP oil absorption amount of generally from 20 to 400 ml/100 g, preferably from 30 to 400 ml/100 g, an average particle size of generally from 5 to 80 nm, preferably from 10 to 50 nm, and more preferably from 10 to 40 nm, and a small amount of carbon black having an average particle size of greater than 80 nm may be contained in a lower layer. Carbon blacks for use in a lower layer have pH of from 2 to 10, a moisture content of from 0.1 to 10%, and a tap density of from 0.1 to 1 g/ml.

The specific examples of carbon blacks for use in a lower layer in the invention are disclosed in WO 98/35345. Carbon blacks can be used within the range not exceeding 50 mass % of the above-described nonmagnetic inorganic powders (exclusive of carbon blacks) and not exceeding 40% of the total mass of a nonmagnetic layer. Carbon blacks can be used alone or in combination. With respect to carbon blacks that can be used in the invention, the description, e.g., in *Carbon Black Binran (Handbook of Carbon Blacks)*, compiled by Carbon Black Kyokai can be referred to.

Organic powders can be used in a lower layer according to purposes. The examples of organic powders include acrylic styrene resin powders, benzoguanamine resin powders, melamine resin powders, and phthalocyanine pigments. In addition, polyolefin resin powders, polyester resin powders, polyamide resin powders, polyimide resin powders and polyethylene fluoride resin powders can also be used. The producing methods of these organic powders are disclosed in JP-A-62-18564 and JP-A-60-255827.

The binder resins, lubricants, dispersants, additives, solvents, dispersing methods and others used in a magnetic layer described later can be used in a lower layer and a backing layer described below. In particular, with respect to the amounts and the kinds of binder resins, additives, the amounts and the kinds of dispersants, well-known techniques regarding a magnetic layer can be applied to a lower layer.

Binder:

Conventionally well-known thermoplastic resins, thermosetting resins, reactive resins and the mixtures of these resins are used as a binder in the invention.

Thermoplastic resins having a glass transition temperature of from –100 to 150° C., a number average molecular weight of from 1,000 to 200,000, preferably from 10,000 to 100,000, and a polymerization degree of from about 50 to about 1,000 can be used in the invention.

The examples of these thermoplastic resins include polymers or copolymers containing, as the constituting unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether; polyurethane resins and various rubber resins. The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook*, Asakura Shoten. It is also possible to use well-known electron beam-curable type resins in each layer. The examples of these resins and manufacturing methods are disclosed in detail in JP-A-62-256219. These resins can be used alone or in combination. The examples of preferred combinations include at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with a polyurethane resin, and combinations of these resins with polyisocyanate.

Polyurethane resins having well known structures, e.g., polyester polyurethane, polyether polyurethane, polyether polyester polyurethane, polycarbonate polyurethane, polyester polycarbonate polyurethane and polycaprolactone polyurethane can be used. For the purpose of obtaining further excellent dispersibility and durability, it is preferred to use at least one polar group selected from the following introduced by copolymerization or addition reaction according to necessity, with respect to all the binders described above, e.g., —COOM, —SO$_3$M, —OSO$_3$M, —P═O(OM)$_2$, —O—P═O(OM)$_2$ (wherein M represents a hydrogen atom or an alkali metal salt group), —NR$_2$, —N$^+$R$_3$ (wherein R represents a hydrocarbon group), an epoxy group, —SH and —CN. The content of the polar group is from 10$^{-1}$ to 10$^{-3}$ mol/g, preferably from 10$^{-2}$ to 10$^{-6}$ mol/g. It is preferred for polyurethane resins to have at least one OH group at each terminal of a polyurethane molecule, i.e., two or more in total, besides the above polar groups. Since OH groups form a three dimensional network structure by crosslinking with a polyisocyanate curing agent, they are preferably contained in a molecule as many as possible. In particular, it is preferred that OH groups are present at terminals of a molecule, since the reactivity with the curing agent becomes high. It is preferred for polyurethane to have three or more OH groups, particularly preferably four or more OH groups, at terminals of a molecule. When polyurethane is used in the invention, the polyurethane has a glass transition temperature of generally from –50 to 150° C., preferably from 0 to 100° C., and particularly preferably from 30 to 100° C., breaking extension of from 100 to 2,000%, breaking stress of generally from 0.05 to 10 kg/mm$^2$ (=about 0.49 to 98 MPa), and a yielding point of from 0.05 to 10 kg/mm$^2$ (=about 0.49 to 98 MPa). Due to these physical properties, a coating film having good mechanical properties can be obtained.

The specific examples of binders for use in the invention include as vinyl chloride copolymers VAGH, VYHH, VMCH, VAGF, VAGD, VROH, VYES, VYNC, VMCC, XYHL, XYSG, PKHH, PKHJ, PKHC and PKFE (manufacturedbyUnion Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.); and as polyurethane resins Nippollan N2301, N2302 and N2304 (manufactured by Nippon Polyurethane Co., Ltd.), Pandex T-5105, T-R3080, T-5201, Burnock D-400, D-210-80, Crisvon 6109and 7209 (manufactured by Dainippon Ink and Chemicals Inc.), Vylon UR8200, UR8300, UR8700, RV530 and RV280 (manufactured by Toyobo Co., Ltd.), polycarbonate polyurethane, Daipheramine 4020, 5020, 5100, 5300, 9020, 9022 and 7020 (manufactured by Dainichiseika Color & Chemicals Mfg. Co., Ltd ), polyurethane, MX5004 (manufactured by Mitsubishi Kasei Corp.), polyurethane, Sunprene SP-150 (manufactured by Sanyo Chemical Industries, Ltd.), and polyurethane, Saran F310 and F210 (manufactured by Asahi Kasei Corporation).

The amount of binders for use in a nonmagnetic layer and a magnetic layer is from 5 to 50 mass %, preferably from 10 to 30 mass %, respectively based on the nonmagnetic inorganic powder and the ferromagnetic powder. When vinyl chloride resins are used, the amount thereof is from 5 to 30 mass %, when polyurethane resins are used, the amount thereof is from 2 to 20 mass %, and it is preferred to use polyisocyanate in an amount of from 2 to 20 mass % in combination with these resins, however, for instance, when the corrosion of heads is caused by a slight amount of chlorine due to dechlorination, it is possible to use polyurethane alone or a combination of polyurethane and isocyanate alone.

When a magnetic recording medium according to the invention comprises two or more layers, the amount of binder, the amounts of vinyl chloride resin, polyurethane resin, polyisocyanate or other resins contained in a binder, the molecular weight of each resin constituting the magnetic layer, the amount of polar groups, or the physical properties of the above-described resins can of course be varied in a nonmagnetic layer and a magnetic layer according to necessity. These factors should be rather optimized in respective layers. Well-known techniques with respect to the multilayer magnetic layers can be used in the invention. For example, when the amount of a binder is varied in each layer, it is effective to increase the amount of a binder contained in a magnetic layer to reduce scratches on the magnetic layer surface. For improving the head touch against the head, it is effective to increase the amount of the binder in a nonmagnetic layer to impart flexibility.

The examples of polyisocyanates for use in the invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate and triphenylmethanetriisocyanate; products of these isocyanates with polyalcohols; and polyisocyanates formed by condensation reaction of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These compounds may be used alone, or in combination of two or more in each layer taking advantage of the difference in curing reactivity.

Carbon Black, Abrasive:

Carbon blacks for use in a magnetic layer in the present invention include furnace blacks for rubbers, thermal blacks for rubbers, carbon blacks for coloring, and acetylene blacks. Carbon blacks for use in the present invention have an $S_{BET}$ of from 5 to 500 m$^2$/g, a DBP oil absorption amount of from 10 to 400 ml/100 g, an average particle size of from 5 to 300 nm, a pH value of from 2 to 10, a moisture content of from 0.1 to 10%, and a tap density of from 0.1 to 1 g/ml. The specific examples of these carbon blacks are disclosed in WO 98/35345.

Carbon blacks can serve various functions such as prevention of static charges of a magnetic layer, reduction of a friction coefficient, impartation of a light-shielding property and improvement of film strength. Such functions vary depending upon the kind of carbon blacks to be used. Accordingly, when the invention takes a multilayer structure, it is of course possible to select and determine the kinds, the amounts and the combinations of the carbon blacks to be added to each layer on the basis of the above-described various properties such as the particle size, the oil absorption amount, the electrical conductance and the pH value, or these should be rather optimized in respective layers.

Well-known materials essentially having a Mohs' hardness of 5 or higher can be used as abrasives in a magnetic layer in the invention alone or in combination, e.g., α-alumina having an a-conversion rate of 90% or more, β-alumina, γ-alumina, fine particle diamond, silicon carbide, chromium oxide, cerium oxide, α-iron oxide, γ-iron oxide, goethite, corundum, silicon nitride, silicon carbide, titanium carbide, titanium oxide, zinc oxide, tin oxide, zirconium oxide, silicon dioxide, and boron nitride. The composites of these abrasives (abrasives obtained by surface-treating with other abrasives) may also be used. Compounds or elements other than their main components are often contained in abrasives, but the intended effects can be attained so long as the content of main component is 90% or more. These abrasives preferably have an average particle size of from 0.01 to 2 μm and, in particular, for improving electromagnetic characteristics, it is preferred to use abrasives having narrow particle size distribution. For improving durability, abrasives respectively having different particle sizes may be combined according to necessity, or a single abrasive having broad particle size distribution may be used so as to attain the same effect as such a combination. Abrasives for use in the invention preferably have a tap density of from 0.3 to 2 g/ml, a moisture content of from 0.1 to 5%, a pH value of from 2 to 11, and an $S_{BET}$ of from 1 to 30 m$^2$/g. The configurations of abrasives for use in the invention may be any of acicular, spherical and die-like configurations, but abrasives having a configuration partly with edges are preferred for their high abrasive property. The specific examples of these abrasives are disclosed in WO 98/35345 and, above all, it is effective to use diamonds in the manner as disclosed in the same patent to improve running durability and electromagnetic characteristics. The particle sizes and the amounts of abrasives to be added to a magnetic layer and a nonmagnetic layer should be independently set at optimal values.

Additive:

As additives for use in a magnetic layer and a nonmagnetic layer in the invention, those having a lubricating effect, an antistatic effect, a dispersing effect and a plasticizing effect are used and comprehensive improvement of performances can be contrived by combining additives. As additives having a lubricating effect, lubricants giving a remarkable action on agglutination caused by the friction of surfaces of materials with each other are used. Lubricants are classified into two types. Lubricants that are used for a magnetic recording medium cannot be judged completely whether they show fluid lubrication or boundary lubrication, but according to general concept they are classified into higher fatty acid esters, liquid paraffin and silicon derivatives which show fluid lubrication, and long chain fatty acids, fluorine surfactants and fluorine-containing polymers which show boundary lubrication. In a coating type magnetic recording medium, lubricants exist in a state dissolved in a binder or in a state of partly being adsorbed onto the surface of hexagonal ferrite magnetic powder, and they migrate to the surface of a magnetic layer. The speed of migration depends upon whether the compatibility of a binder and a lubricant is good or bad. The speed of migration is slow when the compatibility of a binder and a lubricant is good and the migration speed is fast when the compatibility is bad. As one idea as to good or bad of the compatibility, there is a means of comparison of dissolution parameters of a binder and a lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three of these lubricants. Solid lubricants can also be used in combination with these lubricants.

The examples of solid lubricants that can be used in combination include molybdenum disulfide, tungsten disulfide, graphite, boron nitride and graphite fluoride. The examples of long chain fatty acids showing boundary lubrication include monobasic fatty acids having from 10 to 24 carbon atoms (they may contain an unsaturated bond or may be branched) and metal salts of these monobasic fatty acids (e.g., with Li, Na, K or Cu). The examples of fluorine surfactants and fluorine-containing polymers include fluorine-containing silicones, fluorine-containing alcohols, fluorine-containing esters, fluorine-containing alkyl sulfates and alkali metal salts of them. The examples of higher fatty acid esters showing fluid lubrication include fatty acid monoesters, fatty acid diesters and fatty acid triesters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), and fatty acid esters of monoalkyl ethers of alkylene oxide polymers. In addition to the above, the examples further include liquid paraffin, and as silicone derivatives, silicone oils, e.g., dialkylpolysiloxane (the alkyl group has from 1 to 5 carbon atoms), dialkoxypolysiloxane (the alkoxyl group has from 1 to 4 carbon atoms), monoalkyl-monoalkoxypolysiloxane (the alkyl group has from 1 to 5 carbon atoms and the alkoxyl group has from 1 to 4 carbon atoms), phenylpolysiloxane, and fluoroalkylpolysiloxane (the alkyl group has from 1 to 5 carbon atoms), silicones having a polar group, fatty acid-modified silicones, and fluorine-containing silicones.

The examples of other lubricants include alcohols, e.g., mono-, di-, tri-, tetra-, penta- and hexa-alcohols having from 12 to 22 carbon atoms (which may contain an unsaturated bond or may be branched), alkoxy alcohols having from 12 to 22 carbon atoms (which may contain an unsaturated bond or may be branched), and fluorine-containing alcohols, polyethylene waxes, polyolefins such as polypropylene, ethylene glycols, polyglycols such as polyethylene oxide waxes, alkyl phosphates and alkali metal salts of alkyl phosphates, alkyl sulfates and alkali metal salts of alkyl sulfates, polyphenyl ethers, fatty acid amides having from 8 to 22 carbon atoms, and aliphatic amines having from 8 to 22 carbon atoms.

The examples of additives having an antistatic effect, a dispersing effect and a plasticizing effect include phenylphosphonic acid, specifically "PPA" (manufactured by Nissan Chemical Industries, Ltd.), α-naphthylphosphoric acid, phenylphosphoric acid, diphenylphosphoric acid, p-ethyl-benzenephosphonic acid, phenylphosphinic acid, aminoquinones, various kinds of silane coupling agents, titanium coupling agents, fluorine-containing alkyl sulfates and alkali metal salts of them.

Lubricants that are particularly preferably used in the invention are fatty acids and fatty acid esters, and the specific examples are disclosed in WO98/35345. Besides the above, other different lubricants and additives can be used in combination as well.

Additionally, nonionic surfactants, e.g., alkylene oxides, glycerols, glycidols and alkylphenol-ethylene oxide adducts; cationic surfactants, e.g., cyclic amines, ester amides, quaternary ammonium salts, hydantoin derivatives, heterocyclic rings, phosphoniums and sulfoniums; anionic surfactants containing an acid group, such as carboxylic acid, sulfonic acid, phosphoric acid, a sulfuric ester group and a phosphoric ester group; and amphoteric surfactants, e.g., amino acids, aminosulfonic acids, sulfuric esters or phosphoric esters of amino alcohols, and alkylbetaines can also be used. These surfactants are described in detail in *Kaimen Kasseizai Binran* (*Handbook of Surfactants*) (published by Sangyo Tosho Co., Ltd.). These lubricants and antistatic agents need not be 100% pure and may contain impurities such as isomers, non-reacted products, byproducts, decomposed products and oxides, in addition to the main component. However, the content of impurities is preferably 30% or less, more preferably 10% or less.

As disclosed in WO 98/35345, it is preferred to use a monoester and a diester in combination as fatty acid esters in the present invention.

The surface of a magnetic layer of a magnetic recording medium in the invention, in particular a disc-like a magnetic recording medium, has a C/Fe peak ratio of preferably from 5 to 100, particularly preferably from 5 to 80, when measured by Auger electron spectroscopy. The measuring conditions of the C/Fe peak ratio by Auger electron spectroscopy are as follows.

Instrument: Model PHI-660 manufactured by Φ Co.
Measuring conditions:
  Primary electron beam accelerating voltage: 3 KV
  Electric current of sample: 130 nA
  Magnification: 250-fold
  Inclination angle: 30°

The value of C/Fe peak is obtained as the C/Fe ratio by integrating the values obtained under the above conditions in the region of kinetic energy of 130 eV to 730 eV three times and finding the strengths of KLL peak of the carbon and LMM peak of the iron as differentials.

The amount of the lubricants contained in each of an upper layer and a lower layer of a magnetic recording medium in the invention is preferably from 5 to 30 mass parts per 100 mass parts of the ferromagnetic powder and the nonmagnetic inorganic powder.

Lubricants and surfactants for use in the invention respectively have different physical functions. The kinds, amounts and combining proportions bringing about synergistic effects of these lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amount of the surfactant is controlled so as to improve the coating stability, or the amount of the lubricant in the intermediate layer is made larger so as to improve the lubricating effect. The examples are by no means limited thereto. In general, the total amount of lubricants is from 0.1 to 50 mass %, preferably from 2 to 25 mass %, based on the amount of the ferromagnetic powder or the nonmagnetic powder.

All or a part of the additives to be used in the invention may be added to a magnetic coating solution or a nonmagnetic coating solution in any step of preparation. For example, additives may be blended with magnetic powder before a kneading step, may be added in a step of kneading magnetic powder, a binder and a solvent, may be added in a dispersing step, may be added after a dispersing step, or may be added just before coating. According to the purpose, there are cases of capable of attaining the object by coating all or a part of additives simultaneously with or successively after the coating of a magnetic layer. Further, according to purpose, a lubricant maybe coated on the surface of a magnetic layer after calendering treatment or after completion of slitting.

Layer Constitution:

The thickness of the support of a magnetic recording medium in the invention is generally from 2 to 100 μm, preferably from 2 to 80 μm. The thickness of the support of a computer tape is from 3.0 to 6.5 μm, preferably from 3.0 to 6.0 μm, and more preferably from 4.0 to 5.5 μm.

A subbing layer may be provided between a support, preferably a nonmagnetic flexible support and a nonmagnetic or magnetic layer for adhesion improvement. The thickness of the subbing layer is from 0.01 to 0.5 μm, preferably from 0.02 to 0.5 μm.

A backing layer may be provided on the side of a support opposite to the side having a magnetic layer for the purpose of providing static charge prevention and curling correction. The thickness of the backing layer is generally from 0.1 to 4 μm, preferably from 0.3 to 2.0 μm. Well-known subbing layers and backing layers can be used for this purpose.

The thickness of a magnetic layer of the constitution comprising a lower layer and an upper layer in the invention is optimized by the amount of saturation magnetization of the head to be used, the head gap length and the recording signal zone. The thickness of a lower layer is generally from 0.2 to 5.0 μm, preferably from 0.3 to 3.0 μm, and more preferably from 1.0 to 2.5 μm. A lower layer exhibits the effect of the invention so long as it is substantially nonmagnetic even if, or intentionally, it contains a small amount of magnetic powder as the impurity, which is as a matter of course regarded as essentially the same constitution as in the invention. The terminology "substantially nonmagnetic" means that the residual magnetic flux density of a lower layer is 100 mT or less or the coercive force of a lower layer is 100 Oe (=about 8 kA/m) or less, preferably the residual magnetic flux density and the coercive force are zero. When a lower layer contains magnetic powder, the content of the magnetic powder is preferably less than ½ of the total inorganic powders contained in the lower layer. In place of a nonmagnetic layer, a soft magnetic layer containing soft magnetic powder and a binder may be formed as a lower layer. The thickness of the soft magnetic layer is the same as the thickness of a lower layer as described above.

Backing Layer:

A magnetic recording medium in the invention can be provided with a backing layer. A magnetic disc can also be provided with a backing layer, however, in general, a magnetic tape for computer data recording is decidedly required to have an excellent repeating running property as compared with a video tape and an audio tape. It is preferred for a backing layer to contain carbon black and inorganic powder for maintaining such high running durability.

It is preferred to use two kinds of carbon blacks respectively having different average particle sizes in combination. In such a case, fine carbon black having an average particle size of from 10 to 20 nm and coarse carbon black having an average particle size of from 230 to 300 nm are preferably used in combination. In general, by the addition of fine carbon black as above, the surface electrical resistance of a backing layer can be set at a low value and light transmittance can also be set at a low value. Since there are many kinds of magnetic recording apparatus making use of light transmittance of a tape to make it as a signal of operation, addition of fine carbon blacks is particularly effective in such a case. Further, fine carbon blacks are generally excellent in retention of a liquid lubricant and contribute to the reduction of a friction coefficient when a lubricant is used in combination. On the other hand, coarse carbon blacks having an average particle size of from 230 to 300 nm have a function as a solid lubricant and form minute spines on the surface of a backing layer to reduce the contact area and contribute to the reduction of a friction coefficient.

When commercially available products are used as fine carbon blacks and coarse carbon blacks in the invention, those disclosed in WO 98/35345 can be exemplified as the specific examples.

When two kinds of carbon blacks each having different average particle size are used in combination in a backing layer, the proportion of he contents (by mass) of fine carbon black having a particle size of from 10 to 20 nm and coarse carbon black having a particle size of from 230 to 300 nm is preferably the former/latter of from 98/2 to 75/25, more preferably from 95/5 to 85/15.

The content of carbon black in a backing layer (the total amount when two kinds of carbon blacks are used) is generally from 30 to 80 mass parts per 100 mass parts of the binder, preferably from 45 to 65 mass parts.

It is preferred to use two kinds of inorganic powders each having different hardness.

Specifically, soft inorganic powder having a Mohs' hardness of from 3 to 4.5 and hard inorganic powder having a Mohs' hardness of from 5 to 9 are preferably used in combination.

By the addition of soft inorganic powder having a Mohs' hardness of from 3 to 4.5, a friction coefficient can be stabilized against repeating running. Moreover, a sliding guide pole is not scratched off with the hardness within this range. The average particle size of such soft inorganic powder is preferably from 30 to 50 nm.

The examples of soft inorganic powder having a Mohs' hardness of from 3 to 4.5 include, e g., calcium sulfate, calcium carbonate, calcium silicate, barium sulfate, magnesium carbonate, zinc carbonate and zinc oxide. These soft inorganic powders can be used alone or in combination of two or more.

The content of soft inorganic powders in a backing layer is preferably from 10 to 140 mass parts per 100 mass parts of the carbon black, more preferably from 35 to 100 mass parts.

By the addition of hard inorganic powder having a Mohs' hardness of from 5 to 9, the strength of a backing layer increases and running durability is improved. When hard inorganic powders are used together with carbon blacks and soft inorganic powders, deterioration due to repeating sliding can be reduced and a strong backing layer can be obtained. By the addition of hard inorganic powder, appropriate abrasive property is given to a backing layer and the adhesion of scratched powders to a tape guide pole is reduced. When hard inorganic powder is used in particular in combination with soft inorganic powder, sliding characteristics against a guide pole having a rough surface is improved and the stabilization of a friction coefficient of a backing layer can also be brought about.

The average particle size of hard inorganic powders is preferably from 80 to 250 nm, more preferably from 100 to 210 nm.

The examples of hard inorganic powders having a Mohs' hardness of from 5 to 9 include, e.g., α-iron oxide, α-alumina and chromium oxide ($Cr_2O_3$). These powders may be used alone or may be used in combination. Of the above hard inorganic powders, α-iron oxide and α-alumina are preferred. The content of hard inorganic powders in a backing layer is generally from 3 to 30 mass parts per 100 mass parts of the carbon black, preferably from 3 to 20 mass parts.

When soft inorganic powder and hard inorganic powder are used in combination in a backing layer, it is preferred to use them selectively so that the difference of hardness between the soft inorganic powder and the hard inorganic powder be 2 or more, more preferably 2.5 or more, and particularly preferably 3 or more.

It is preferred that the above-described two kinds of inorganic powders each having a specific average particle size and different in Mohs' hardness and the above-described two kinds of carbon blacks each having a different average particle size be contained in a backing layer.

A backing layer may contain a lubricant. A lubricant can be arbitrarily selected from among the lubricants that can be used in a nonmagnetic layer or a magnetic layer as described above. The content of a lubricant in a backing layer is generally from 1 to 5 mass parts per 100 mass parts of the binder.

Support:

A support for use in the invention is preferably a nonmagnetic flexible support, and essentially has a thermal shrinkage factor of preferably 0.5% or less at 100° C. for 30 minutes, and of preferably 0.5% or less at 80° C. for 30 minutes, more preferably 0.2% or less, in every direction of in-plane of the support. Further, the thermal shrinkage factors of the support at 100° C. for 30 minutes and at 80° C. for 30 minutes are preferably almost equal in every direction of in-plane of the support with difference of not more than 10%. The support is preferably a nonmagnetic support. As nonmagnetic supports, well-known films such as polyesters (e.g., polyethylene terephthalate and polyethylene naphthalate), polyolefins, cellulose triacetate, polycarbonate, aromatic or aliphatic polyamide, polyimide, polyamideimide, polysulfone polyaramid and polybenzoxazole can be used. High strong supports such as polyethylene naphthalate and polyamide are preferably used. If necessary, a lamination type support as disclosed in JP-A-3-224127 can be used to vary the surface roughness of a magnetic layer surface and a base surface. These supports may be subjected in advance to surface activation treatment, e.g., corona discharge treatment, plasma treatment, adhesion assisting treatment, heat treatment or dust-removing treatment. Aluminum or glass substrate can also be used as a support in the invention.

For attaining the object of the invention, it is necessary to use a support having a central plane average surface roughness (Ra) of 4.0 nm or less, preferably 2.0 nm or less, measured by a surface roughness meter TOPO-3D (a product of WYKO Co.). It is preferred that the support not only has a small central plane average surface roughness but also is free from coarse spines having heights of 0.5 μm or more. Surface roughness configuration is freely controlled by the size and the amount of a filler added to a support. The examples of fillers include oxides of Ca, Si and Ti, α-alumina, carbonates, and acrylic-based organic powders. A support for use in the invention preferably has a maximum height (Rmax) of 1 μm or less, a ten point average roughness (Rz) of 0.5 μm or less, a central plane peak height (Rp) of 0.5 μm or less, a central plane valley depth (Rv) of 0.5 μm or less, a central plane area factor (Sr) of from 10% to 90%, and average wavelength (λa) of from 5 to 300 μm. For obtaining desired electromagnetic characteristics and durability, the spine distribution on the surface of a support can be controlled arbitrarily by using fillers, e.g., the number of spines having sizes of from 0.01 to 1 μm can be controlled each within the range of from 0 to 2,000 per 0.1 $mM^2$.

Supports for use in the invention have an F-5 value of preferably from 5 to 50 kg/$mm^2$ (=about 49 to 490 MPa), a thermal shrinkage factor at 100° C. for 30 minutes of preferably 3% or less, more preferably 1.5% or less, a thermal shrinkage factor at 80° C. for 30 minutes of preferably 1% or less, more preferably 0.5% or less, a breaking strength of from 5 to 100 kg/$mm^2$ (=about 49 to 980 MPa), an elastic modulus of from 100 to 2,000 kg/$mm^2$ (=about 0.98 to 19.6 GPa), a temperature expansion coefficient of from $10^{-4}$ to $10^{-8}$/° C, preferably from $10^{-5}$ to $10^{-6}$/° C., and a humidity expansion coefficient of $10^{-4}$/RH % or less, preferably $10^{-5}$/RH% or less. These thermal characteristics, dimensional characteristics and mechanical strength characteristics are preferably almost equal in every direction of in-plane of supports with difference of not more than 10%.

Manufacturing Method:

The manufacturing process of a magnetic coating solution of a magnetic recording medium in the invention comprises at least a kneading step, a dispersing step and optionally a blending step to be carried out before and/or after the kneading and dispersing steps. Each of these steps may be composed of two or more separate stages. All of the feedstocks such as magnetic powder, nonmagnetic powder, a binder, carbon black, an abrasive, an antistatic agent, a lubricant and a solvent for use in the invention may be added at any step at any time. Each feedstock may be added at two or more steps dividedly. For example, polyurethane can be added dividedly at a kneading step, a dispersing step, or a blending step for adjusting viscosity after dispersion. For achieving the object of the invention, conventionally well-known techniques can be performed partly with the above steps. Powerful kneading machines such as an open kneader, a continuous kneader, a pressure kneader or an extruder are preferably used in a kneading step. When a kneader is used, all or a part of the binder (preferably 30% or more of the total binders) is kneaded in the range of from 15 parts to 500 parts per 100 parts of the magnetic powder or nonmagnetic powder together with the magnetic powder or nonmagnetic powder. These kneading treatments are disclosed in detail in JP-A-1-106338 and JP-A-1-79274. For dispersing a magnetic layer coating solution and a nonmagnetic layer coating solution, glass beads can be used, but dispersing media having a high specific gravity, e.g., zirconia beads, titania beads and steel beads are preferred for this purpose. Optimal particle size and packing density of these dispersing media have to be selected. Well-known dispersers can be used in the invention.

The following methods are preferably used for coating a magnetic recording medium having a multilayer structure in the invention. As a first method, a lower layer is coated by any of gravure coating, roll coating, blade coating, and extrusion coating apparatus, which are well known in the coating of a magnetic coating solution, and an upper layer is coated while the lower layer is still wet by means of a support pressing type extrusion coating apparatus as disclosed in JP-B-1-46186, JP-A-60-238179 and JP-A-2-265672. As a second method, an upper layer and a lower layer are coated almost simultaneously with a coating head equipped with two slits for feeding a coating solution as disclosed in JP-A-63-98080, JP-A-2-17971 and JP-A-2-265672. As a third method, an upper layer and a lower layer are coated almost simultaneously with an extrusion coating apparatus equipped with a backup roll as disclosed in JP-A-2-174965. For preventing the deterioration of the electromagnetic characteristics of a magnetic recording medium due to the agglomeration of magnetic particles, it is preferred to impart shear to the coating solution in a coating head by the methods as disclosed in JP-A-62-95174 and JP-A-1-236968. With respect to the viscosity of a coating solution, the range of the numeric values disclosed in JP-A-3-8471 is necessary to be satisfied. For realizing the constitution of the invention, a successive multilayer coating method in which a magnetic layer is coated on a lower layer after the lower layer has been coated and dried can of course be used without impairing the effect of the invention. However, for reducing coating defects and improving qualities, e.g., free of dropout, it is preferred to use the above simultaneous multilayer coating method.

In the case of a magnetic disc, isotropic orienting property can be sufficiently obtained in some cases without performing orientation with orientating apparatus, but it is preferred to use well-known random orientation apparatus, e.g., disposing cobalt magnets diagonally and alternately or applying an alternating current magnetic field with a solenoid. Hexagonal ferrite magnetic powders have generally an inclination for three-dimensional random orientation of in-plane and in the perpendicular direction, however, it is also possible to make in-plane two-dimensional random orientation. It is also possible to impart isotropic magnetic characteristics in the circumferential direction by perpendicular orientation using well-known methods, e.g., using different pole and counter position magnets. In particular, perpendicular orientation is preferred when the disc is used in high density recording. Circumferential orientation can be performed using spin coating.

In the case of a magnetic tape, orientation is effected in the machine direction by a cobalt magnet and a solenoid. In orientation, it is preferred that the drying position of a coated film be controlled by controlling the temperature and the amount of drying air and coating rate. Coating rate is preferably from 20 to 1,000 m/min and the temperature of drying air is preferably 60° C. or more. Preliminary drying can be performed appropriately before entering a magnet zone.

Heat resisting plastic rolls, e.g., epoxy, polyimide, polyamide and polyimideamide or metal rolls are used for calendering treatment. Metal rolls are preferably used for the treatment particularly when magnetic layers are coated on both surfaces of a support. The treatment temperature is preferably 50° C. or more, more preferably 100° C. or more. The linear pressure is preferably 200 kg/cm (=about 196 kN/m) or more, more preferably 300 kg/cm (=about 294 kN/m) or more.

Physical Properties:

Residual magnetic flux density x magnetic layer thickness of a magnetic recording medium according to the invention is preferably from 5 to 200 mT·μm. The coercive force (Hc) is preferably from 1,700 to 5,000 Oe (=about 136 to 400 kA/m), more preferably from 1,800 to 3,5000 Oe (=about 144 to280 kA/m). The distribution of the coercive force is preferably narrow, and SFD (switching field distribution) and SFDr are preferably 0.7 or less.

The squareness ratio (SQ) of a magnetic disc is from 0.55 to 0.67, preferably from 0.58 to 0.64, in the case of two dimensional random orientation, from 0.45 to 0.55 in the case of three dimensional random orientation, and in the case of perpendicular orientation generally 0.6 or more in the perpendicular direction, preferably 0.7 or more, and 0.7 or more when diamagnetic correction is performed, preferably 0.8 or more. Degree of orientation in two-dimensional random orientation and three-dimensional random orientation is preferably 0.8 or more. In the case of two-dimensional random orientation, the squareness ratio in the perpendicular direction, the Br in the perpendicular direction, and the Hc in the perpendicular direction are preferably from 0.1 to 0.5 times as small as those in the in-plane direction.

In the case of a magnetic tape, the squareness ratio is 0.7 or more, preferably 0.8 or more.

A magnetic recording medium in the invention has a friction coefficient against a head at temperature of −10° C. to 40° C. and humidity of 0% to 95% of 0.5 or less, preferably 0.3 or less, the intrinsic resistivity of the surface of a magnetic layer of preferably from $10^4$ to $10^{12}$ Ω/sq, and a charge potential of preferably from −500 V to +500 V. The elastic modulus at 0.5% elongation of a magnetic layer is preferably from 100 to 2,000 kg/mm2 (=about 980 to 19,600 N/mm$^2$) in every direction of in-plane, the breaking strength is preferably from 10 to 70 kg/mm$^2$ (=about 98 to 686 N/mm$^2$), the elastic modulus of a magnetic recording medium is preferably from 100 to 1,500 kg/mm$^2$ (=about 980 to 14,700 N/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of a magnetic layer (the maximum point of the loss elastic modulus by dynamic viscoelasticity measurement at 110 Hz) is preferably from 50° C. to 120° C., and that of a lower layer is preferably from 0° C. to 100° C. The loss elastic modulus is preferably in the range of from $1 \times 10^3$ to $1 \times 10^4$ N/cm$^2$, and loss tangent is preferably 0.2 or less. When loss tangent is too large, adhesion failure is liable to occur. These thermal and mechanical characteristics are preferably almost equal in every direction of in-plane of the medium with difference of not more than 10%. The residual amount of a solvent in a magnetic layer is preferably 100 mg/m$^2$ or less, more preferably 10 mg/M$^2$ or less. The void ratio of a coated layer is preferably 30% by volume or less, more preferably 20% by volume or less, with both of a lower layer and an upper layer. The void ratio is preferably smaller for obtaining high output but in some cases a specific value should be preferably secured depending on purposes. For example, in a disc-like medium that is repeatedly used, large void ratio contributes to good running durability in many cases.

A magnetic layer surface has a central plane average surface roughness (Ra) measured with a surface roughness meter TOPO-3D (a product of WYKO Co.) of preferably 5.0 nm or less, more preferably 4.0 nm or less, and especially preferably 3.5 nm or less. A magnetic layer preferably has a maximum height (Rmax) of 0.5 μm or less, a ten point average roughness (Rz) of 0.3 μm or less, a central plane peak height (Rp) of 0.3 μm or less, a central plane valley depth (Rv) of 0.3 μm or less, a central plane area factor (Sr) of from 20% to 80%, and average wavelength (Xa) of from 5 to 300 μm. The surface spines of a magnetic layer of sizes of from 0.01 to 1 μm can be controlled arbitrarily within the range of from 0 to 2,000, and it is preferred to optimize electromagnetic characteristics and a friction coefficient by controlling the surface spines of a magnetic layer. The surface spines can be easily controlled by the control of the surface property by using fillers, the particle size and the amount of the magnetic powders added to a magnetic layer, or by the surface configurations of the rolls of calender treatment. Curing is preferably within ±3 mm. It can be easily presumed that these physical properties of a magnetic recording medium in the invention can be varied according to purposes in a lower layer and an upper layer. For example, the elastic modulus of an upper layer is made higher to improve running durability and at the same time the elastic modulus of a lower layer is made lower that that of the upper layer to improve the head touching of the magnetic recording medium.

EXAMPLES

The present invention is described in detail with reference to examples, but the invention is not limited thereto. In the following, "parts" means "mass (weight) parts".

Example 1

Preparation of Coating Solution

Magnetic Coating Solution:

| | |
|---|---|
| Ferromagnetic metal fine powder<br>Co/Fe = 30 atomic %, Al/Fe = 8 atomic %,<br>Y/Fe = 6 atomic %, Hc: 187 kA/m (2,350 Oe),<br>$S_{BET}$: 55 m$^2$/g, σs: 140 A·m$^2$/kg, crystallite<br>size: 140 Å, average long axis length: 68 nm,<br>average acicular ratio: 6, oxide film on the<br>surface: 25 Å) | 100 parts |
| Vinyl chloride copolymer<br>MR110 (manufactured by Nippon Zeon Co., Ltd.) | 12 parts |
| Polyurethane resin<br>UR8200 (manufactured by Toyobo Co., Ltd.) | 4 parts |
| α-Alumina (see Table 1) | 5 parts |
| Carbon black<br>(average particle size: 40 nm) | 5 parts |
| Butyl stearate | 5 parts |
| Stearic acid | 6 parts |
| Methyl ethyl ketone | 180 parts |
| Cyclohexanone | 180 parts |

Nonmagnetic Coating Solution:

| | |
|---|---|
| Nonmagnetic powder<br>Acicular hematite (average long axis length:<br>0.15 µm, $S_{BET}$: 50 m$^2$/g, pH: 8.5, surface-<br>covering compound: $Al_2O_3$) | 80 parts |
| Carbon black<br>(average particle size: 20 nm) | 20 parts |
| Vinyl chloride copolymer<br>MR110 (manufactured by Nippon Zeon Co., Ltd.) | 12 parts |
| Polyurethane resin<br>UR8200 (manufactured by Toyobo Co., Ltd.) | 5 parts |
| Butyl stearate | 1 part |
| Stearic acid | 3 parts |
| Methyl ethyl ketone/cyclohexanone<br>(8/2 mixed solvent) | 250 parts |

With each of the above compositions of the magnetic layer coating solution and the nonmagnetic layer coating solution, components were kneaded in a kneader, and then dispersed in a sand mill for 4 hours. Polyisocyanate was added to each resulting dispersion solution, in an amount of 2.5 parts to the nonmagnetic layer coating solution and 3 parts to the magnetic layer coating solution. Further, 40 parts of cyclohexanone was added to each solution, and each solution was filtered through a filter having an average pore diameter of 1 µm to obtain coating solutions for forming a nonmagnetic layer and a magnetic layer. The nonmagnetic layer-forming coating solution and magnetic layer-forming coating solution were simultaneously multilayer-coated on an aramid support having a thickness of 4.4 µm and a central plane average surface roughness of 2 nm. The nonmagnetic layer-forming coating solution was coated in a dry thickness of 1.5 µm, immediately thereafter the magnetic layer-forming coating solution was coated on the lower layer in a dry thickness of 0.05 µm. Both layers were subjected to orientation with a cobalt magnet having a magnetic force of 600 mT and a solenoid having a magnetic force of 600 mT while both layers were still wet. After drying, the coated layers were subjected to calendering treatment by a calender of seven stages comprising metal rolls alone at 85° C. and a velocity of 200 m/min. Thereafter, a backing layer having a thickness of 0.5 µm was coated. The obtained web was slit to a width of 8 mm. The magnetic layer surface of the manufactured tape was cleaned with a tape cleaning apparatus having a delivery and a winding-up movement of a slit product to which a nonwoven fabric and a razor blade were attached so as to be pressed against the magnetic surface of the tape, thereby a tape sample was obtained.

Examples 2 to 5 and Comparative Examples 1 to 4

Each magnetic tape sample was prepared in the same manner as in Example 1 except for changing the thickness of each magnetic layer as shown in Table 1 below.

Performances of each tape were measured and evaluated by the following methods.

(1) Abrasive (particle size distribution): An appropriate amount of α-alumina was taken, and an average particle size and a variation coefficient were obtained by measuring 500 particles selected at random from electron microphotographs by the above-described method.

(2) Relative abrasive velocity: Mn—Zn ferrite single crystal (111) face was abraded on a buff while supplying a certain amount of alumina slurry, and the abraded amount (length) per unit time was compared with the abraded amount of a standard sample.

(3) Electromagnetic characteristics of a tape (S/N): A recording head (MIG, gap: 0.15 µm, 1.8 T) was attached to a drum tester and digital signals were recorded and reproduced. Modulation noise was measured at head-medium relative velocity of 3 m/sec and recording wavelength of 0.35 µm. Samples in comparative examples respectively different in magnetic layer thickness were taken as references, i.e., 0 dB, and the S/N ratio of each sample was indicated as a relative value. That is, the reference sample of samples in Examples 1 to 3 and Comparative Example 4 having a magnetic layer thickness of 50 nm was Comparative Example 1, the reference of Example 4 having a magnetic layer thickness of 100 nm was Comparative Example 2, and the reference of Example 5 having a magnetic layer thickness of 150 nm was Comparative Example 3.

(4) Still characteristics: Reproduction was performed with 8 mm video cassette FUJIX8 (manufactured by Fuji Photo Film Co., Ltd.) by still mode in three atmospheres of 23° C. 50% RH, 5° C. 20% RH and 40° C. 80% RH.

The case where reproduction was well effected for 30 minutes or more in all of three atmospheres was graded o, the case where reproduction was well effected for 15 to 30 minutes in at least one atmosphere of three was graded Δ, and the case where reproduction could not be done for more than 15 minutes in at least one atmosphere of three was graded x.

(5) Head abrasion: A tape having a width of 3.8 mm was prepared and after being initialized by a special cleaning tape with DCR-IP7 (manufactured by Sony Corporation), the tape was run 200 hours continuously. The head was detached thereafter, the three dimensional configuration of the surface of the head was measured with an atomic force microscope (SPA500, manufactured by Seiko Instruments Inc.), and the difference in level in the perpendicular direction near MR elements and ceramic members of the outside was searched for. The measurement was performed in the range of 20 μm×20 μm, by contact mode and scanning velocity of 1 Hz. The difference in level of 45 nm or less was taken as good, and the case of 45 nm or less was graded o, and the case of greater than 45 nm was graded x.

This application is based on Japanese Patent application JP 2003-147717, filed May 26, 2003, the entire content of which is hereby incorporated by reference, the same as if set forth at length.

What is claimed is:

1. A magnetic recording medium comprising a support and a magnetic layer containing an abrasive, a binder and ferromagnetic powder dispersed in the binder, wherein the magnetic layer has a thickness of from 20 to 150 nm, the abrasive is alumina having an average particle size of from 10 to 160 nm, a Mohs' hardness of 5 or more, and a relative abrasive velocity of 60 to 190 and value A of a relational expression $A=K/Z$ of an average particle size K of the abrasive and the thickness Z of the magnetic layer is from 0.1 to 3.0.

2. The magnetic recording medium according to claim 1, wherein the abrasive has a relative abrasive velocity of 70 to 190.

3. The magnetic recording medium according to claim 1, wherein the value A is from 0.5 to 2.5.

TABLE 1

| | | Abrasives | | | | | | | |
|---|---|---|---|---|---|---|---|---|---|
| Sample | Kind | Average Particle Size K (nm) | Particle Size σ | Variation Coefficient of Particle Size (%) | Relative Abrasive Velocity | Magnetic Layer Thickness Z (nm) | K/Z | Still Characteristics | S/N (dB) | Head Abrasion |
| Example 1 | α-Alumina | 94 | 40 | 43 | 190 | 50 | 1.9 | o | 1.2 | o |
| Example 2 | α-Alumina | 92 | 25 | 27 | 70 | 50 | 1.8 | o | 1.5 | o |
| Example 3 | α-Alumina | 121 | 36 | 30 | 160 | 50 | 2.4 | o | 0.9 | o |
| Example 4 | α-Alumina | 94 | 40 | 43 | 190 | 100 | 0.9 | o | 1.3 | o |
| Example 5 | α-Alumina | 94 | 40 | 43 | 190 | 150 | 0.6 | o | 1.2 | o |
| Comparative Example 1 | α-Alumina | 176 | 74 | 42 | 500 | 50 | 3.5 | o | 0.0 | x |
| Comparative Example 2 | α-Alumina | 176 | 74 | 42 | 500 | 100 | 1.8 | o | 0.0 | x |
| Comparative Example 3 | α-Alumina | 176 | 74 | 42 | 500 | 150 | 1.2 | o | 0.0 | x |
| Comparative Example 4 | α-Alumina | 202 | 97 | 48 | 120 | 50 | 4.0 | o | −0.5 | x |

It can be seen from the results in Table 1 that since the relative abrasive velocity, the magnetic layer thickness Z and $A=K/Z$ of the samples in the invention are in the prescribed ranges of the invention, the samples in Examples of the present invention are excellent in S/N ratio and low in head abrasion as compared with comparative samples whose relative abrasive velocity and/or A deviate from the prescribed range. The samples in Examples of the invention are also compatible with still characteristics.

A magnetic recording medium in the present invention comprises a support having provided thereon a magnetic layer containing ferromagnetic powder dispersed in a binder, wherein the thickness of the magnetic layer is from 20 to 500 nm, the Mohs' hardness of an abrasive contained in the magnetic layer is 5 or more, the relative abrasive velocity is less than 200, and value A of the relational expression $A=K/Z$ of the average particle size K of the abrasive and the magnetic layer thickness Z is from 0.1 to 3.0. By this constitution of the magnetic recording medium of the present invention, S/N ratio of electromagnetic characteristics can be improved and head abrasion can be reduced while securing the improvement of running durability.

4. The magnetic recording medium according to claim 1, wherein the magnetic layer has a thickness of from 30 to 150 nm.

5. The magnetic recording medium according to claim 1, wherein the magnetic layer contains a carbon black.

6. The magnetic recording medium according to claim 1, wherein the alumina has an average particle size of from 30 to 150 nm.

7. The magnetic recording medium according to claim 1, further comprising a substantially nonmagnetic lower layer so that the support, the substantially nonmagnetic lower layer and the magnetic layer are in this order.

8. The magnetic recording medium according to claim 7, wherein the substantially nonmagnetic lower layer contains a carbon black.

9. The magnetic recording medium according to claim 7, wherein the substantially nonmagnetic lower layer and the magnetic layer are formed by a simultaneous multilayer coating method.

10. The magnetic recording medium according to claim 7, wherein the substantially nonmagnetic lower layer contains nonmagnetic inorganic powder and a binder.

11. The magnetic recording medium according to claim 10, wherein the nonmagnetic inorganic powder has an average particle size of from 0.01 to 2 μm.

12. The magnetic recording medium according to claim 1, further comprising a backing layer so that the backing layer, the support, and the magnetic layer are in this order, wherein the backing layer contains inorganic powder and a carbon black.

13. The magnetic recording medium according to claim 12, wherein the backing layer contains a carbon black having an average particle size of from 10 to 20 nm and a carbon black having an average particle size of from 230 to 300 nm.

14. The magnetic recording medium according to claim 12, wherein the backing layer contains inorganic powder having a Mohs' hardness of from 3 to 4.5 and inorganic powder having a Mohs' hardness of from 5 to 9.

* * * * *